(12) United States Patent
Hielscher et al.

(10) Patent No.: US 10,637,023 B2
(45) Date of Patent: Apr. 28, 2020

(54) BATTERY CARRIER FOR AN ELECTRIC MOTOR VEHICLE

(71) Applicant: BENTELER AUTOMOBILTECHNIK GMBH, Paderborn (DE)

(72) Inventors: Christian Hielscher, Delbrueck (DE); Conrad Frischkorn, Paderborn (DE); Julian Grenz, Delbrueck (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 16/122,393

(22) Filed: Sep. 5, 2018

(65) Prior Publication Data

US 2019/0074496 A1   Mar. 7, 2019

(30) Foreign Application Priority Data

Sep. 6, 2017 (DE) .......................... 10 2017 120 546

(51) Int. Cl.
*B60K 1/04* (2019.01)
*H01M 2/10* (2006.01)
*B60L 50/64* (2019.01)

(52) U.S. Cl.
CPC .......... *H01M 2/1083* (2013.01); *B60L 50/64* (2019.02); *H01M 2/1077* (2013.01); *B60K 2001/0438* (2013.01); *H01M 2220/20* (2013.01)

(58) Field of Classification Search
CPC .................. B60K 1/04; B60R 16/04
USPC ........................ 180/68.5; 29/505; 220/4.02
See application file for complete search history.

(56) References Cited

U.S. PATENT DOCUMENTS

| | | | | |
|---|---|---|---|---|
| 1,420,694 A | * | 6/1922 | Gore ...................... | H02G 3/086 220/3.94 |
| 2,850,202 A | * | 9/1958 | Schneider .............. | B21D 51/52 220/3.2 |
| 4,006,670 A | * | 2/1977 | Royal .................. | B65D 5/2052 493/10 |
| 4,203,379 A | * | 5/1980 | Lambertson ........... | B21D 51/18 72/389.3 |

(Continued)

FOREIGN PATENT DOCUMENTS

| | | |
|---|---|---|
| DE | 202013008275 U1 | 12/2014 |
| DE | 102013112731 A1 | 5/2015 |
| DE | 202016102223 U1 | 5/2016 |

OTHER PUBLICATIONS

Office Action for German Application No. 10 2017 120 546.2 dated May 25, 2018; 11pp.

*Primary Examiner* — Jeffrey J Restifo
(74) *Attorney, Agent, or Firm* — Hauptman Ham, LLP

(57) ABSTRACT

The present invention relates to a battery carrier for an electric motor vehicle, having a tray 1 having a base 2 and a peripheral wall which protrudes from the base and a flange 4 which protrudes from the wall so as to be orientated in an outward direction, characterized in that the tray 1 is integrally produced as a folding component and in a materially integral manner from a plate 6, wherein in at least one the corner region 8 of the peripheral wall there is formed on a side wall 3 at least one joining plate 5 which overlaps the adjacent side wall 3 and the joining plate 5 and the adjacent side wall 3 are joined to each other.

12 Claims, 8 Drawing Sheets

(56) References Cited

U.S. PATENT DOCUMENTS

| | | | | | |
|---|---|---|---|---|---|
| 4,239,148 | A * | 12/1980 | Sorenson | | B65D 5/2042 229/143 |
| 4,263,472 | A * | 4/1981 | Maheu | | H02G 3/126 174/51 |
| 4,715,507 | A * | 12/1987 | Chamberlin | | H02G 3/123 174/53 |
| 4,734,971 | A * | 4/1988 | Dupasquier | | B21D 39/03 138/166 |
| 4,986,466 | A * | 1/1991 | Colby | | B65D 5/28 229/132 |
| 5,272,279 | A * | 12/1993 | Filshie | | H02B 1/40 174/50 |
| 5,437,939 | A * | 8/1995 | Beckley | | B66F 9/07531 429/99 |
| 5,480,053 | A * | 1/1996 | Jorgensen | | H02G 3/081 220/3.9 |
| 5,594,207 | A * | 1/1997 | Fabian | | H02G 3/086 174/53 |
| 5,703,327 | A * | 12/1997 | Jorgensen | | H02G 3/086 174/53 |
| 5,709,280 | A * | 1/1998 | Beckley | | B60R 16/04 180/68.5 |
| 6,230,834 | B1 * | 5/2001 | Van Hout | | B60R 16/04 180/68.5 |
| 7,273,982 | B1 * | 9/2007 | Lalancette | | H02G 3/086 174/50 |
| 7,368,661 | B2 * | 5/2008 | Lalancette | | H02G 3/08 174/50 |
| 7,610,978 | B2 * | 11/2009 | Takasaki | | B60K 1/04 180/68.5 |
| 7,752,731 | B2 * | 7/2010 | Lalancette | | H02G 3/086 29/450 |
| 8,403,090 | B2 * | 3/2013 | Fujiwara | | H01M 2/1077 180/68.5 |
| 8,511,412 | B2 * | 8/2013 | Kawaguchi | | H01M 2/1083 180/68.5 |
| 8,689,932 | B2 * | 4/2014 | Dupont | | F16M 1/00 181/200 |
| 8,714,397 | B2 * | 5/2014 | Bravo | | B67D 7/78 220/567.1 |
| 8,789,256 | B2 * | 7/2014 | Temblador | | B21D 51/52 29/505 |
| 8,980,458 | B2 * | 3/2015 | Honjo | | B60K 1/04 429/100 |
| 9,056,631 | B2 * | 6/2015 | Nakamori | | B60K 1/04 |
| 9,472,792 | B2 * | 10/2016 | Subramanian | | B60L 50/64 |
| 9,553,433 | B2 * | 1/2017 | Lalancette | | H02G 3/08 |
| 10,232,697 | B2 * | 3/2019 | Hara | | B60K 1/04 |
| 10,259,309 | B2 * | 4/2019 | Ajisaka | | B60K 1/04 |
| 2016/0263639 | A1 * | 9/2016 | Yoshida | | B21D 51/52 |

* cited by examiner

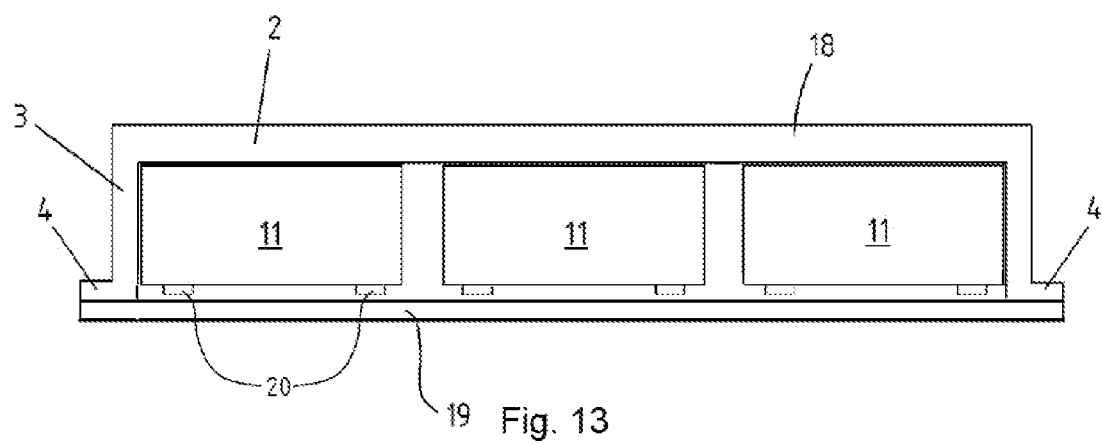

BATTERY CARRIER FOR AN ELECTRIC MOTOR VEHICLE

RELATED APPLICATIONS

The present application claims priority of German Application Number 10 2017 120 546.2 filed Sep. 6, 2017, the disclosure of which is hereby incorporated by reference herein in its entirety.

The present invention relates to a battery carrier for an electric motor vehicle according to the features in the preamble of claim 1.

Electromobility has become increasingly relevant in the use of motor vehicles. In this instance, electric motor vehicles are primarily or exclusively driven by electric energy. In order to store this electric energy in the electric motor vehicle, batteries, also referred to as accumulators, high-voltage batteries or travel batteries, which have a considerable volume proportion and a relatively high inherent weight, are required. Such batteries, so that an adequate quantity of energy can be stored, for example, in order to achieve a range of 300 km with one battery charge, are arranged in the underfloor region of a motor vehicle. The batteries themselves are accommodated in a battery carrier so that they are protected, on the one hand, against external weather influences, on the other hand, a discharge of materials which are contained in the batteries to the environment is prevented.

From the prior art there are known for this purpose battery carriers which are produced from plastics materials, fiber composite materials or also from metal materials. The battery carriers are also referred to as a "battery tray".

Such a battery carrier is mostly mounted from below on a motor vehicle and extends primarily over a large portion of the motor vehicle width and also a portion of the motor vehicle length.

A battery carrier is distinguished by a tray-like housing in which a plurality of batteries are arranged. So that a corresponding rigidity of the battery carrier is ensured, there is arranged so as to extend at the outer side a frame comprising a hollow profile which can also act at the same time as a peripheral wall of the tray. A battery carrier is arranged in the non-visible underfloor region of the motor vehicle. The requirements with respect to tightness and the production tolerances are high. The production costs of the battery carrier are, however, subjected to a massive cost pressure.

The battery tray of a battery carrier is sometimes produced as a metal sheet shaping component. A generic specification in this regard is US 2016/0263639 A1.

In this case, however, in the corner regions there are sometimes problems with the bending shaping operation.

An object of the present invention is therefore to provide a battery carrier which, with regard to the production thereof and in particular the produced corner connections, is improved with regard to battery carriers known from the prior art.

The object mentioned above is achieved according to the invention with a battery carrier having the features in claim 1.

Advantageous construction variants are described in the dependent claims.

The battery carrier for an electric motor vehicle has a tray, also referred to below as a battery tray. The tray itself has a base and a peripheral wall which protrudes from the base and which is produced from side walls which are coupled to each other. In turn a flange protrudes from the wall so as to be orientated in an outward direction. According to the invention, the tray is integrally produced as a folding component or bending component and in a materially integral manner from a plate, wherein in at least one corner region, preferably in all corner regions of the side walls, there is formed on a side wall at least one joining plate which overlaps the adjacent side wall, wherein the joining plate and the adjacent side wall are joined to each other, respectively.

Consequently, the tray can preferably be produced as a folding component or bending component. This affords the advantage that there can be produced between the base and side wall a small bending radius which is preferably 10 times smaller than the wall thickness, preferably 5 times smaller than, particularly preferably 3 times smaller than and in particular 1.5 times smaller than the wall thickness of the sheet metal plate. The bending radius is consequently produced between the base and the side wall and between the side wall and the joining plate and consequently between the side wall and side wall.

The production according to the invention consequently enables, when a sheet metal plate of a steel alloy is used, a tensile strength Rm greater than 600 MPa to be produced.

Furthermore, when an aluminum alloy in the rolled state is used to produce the tray, a tensile strength Rm greater than 250 MPa can be achieved. Since in particular no deep-drawing method is used to produce the tray, materials with higher levels of strength can consequently be used. This in turn enables a reduction of the wall thickness, which in turn reduces the weight and/or the used material the mass raw material used with at least consistent strength properties.

The plate is in particular a sheet metal plate, preferably of a sheet steel or an aluminum alloy. The tray itself is configured in a substantially rectangular manner. The joining plate is in each case constructed integrally and in a materially integral manner on a side wall and overlaps a part or a portion of the adjacent side wall in each case and is thermally joined to this portion of the side wall, in particular by means of seal welding. Seal welding means in the context of this invention in particular that contamination or moisture from the outer side do not reach the battery tray which can optionally be closed with a lid. Outgoing fluids from the batteries will also not be able to leave the battery tray. Preferably, additionally or alternatively, adhesive can also be used. It is also possible for a sealing agent or sealing material to be used between the joining plate and side wall or around the joining plate, preferably in combination with welding, in particular spot welding or mechanical joining, for example, clinching or riveting.

The joining plate itself may then, with respect to an inner space of the tray, overlap the adjacent side wall at the outer side or inner side. In a particularly preferred construction variant, both side walls which are adjacent to each other in a corner region have a joining plate, wherein in each case a joining plate overlaps the opposing adjacent side wall, wherein one joining plate is preferably arranged at the inner side and one joining plate is arranged at the outer side.

The flange which protrudes outward is coupled in a respective corner region in the direction of a projection in extension of a side wall by means of a thermal joining seam. However, the flange may also alternatively be constructed in the respective corner region so as to extend at a 45° angle by means of a thermal joining seam. The respective portions of the flange of the adjacent side walls are then coupled to each other by means of the joining seam.

Within the tray itself, there may be arranged reinforcement struts which can be used in particular to receive batteries which are arranged in the tray. The reinforcement struts may also be able to be used to transmit crash energy.

The thermal joining seam is generally formed as a continuous weld seam. In a particularly preferred manner, with two joining plates of mutually adjacent side walls, at least one joining seam is coupled to a continuous weld seam. This continuous weld seam preferably extends from the flange via the side wall as far as the base. The second joining plate may, for example, also be coupled to the side wall by means of spot welding.

Furthermore, the side walls and/or floor preferably have embossings, in particular linear embossings. These may preferably be introduced into the sheet metal plate before the shaping or the folding operation. Preferably, the embossings are directed outward. They may also be directed inward. In a particularly preferred manner, the embossings are arranged in the region below a reinforcement strut. In particular, the embossing protrudes into a hollow space of a reinforcement strut.

In an alternative design variant of the present invention, the above-described tray, also referred to as folding tray, is, in an installed situation, arranged not at the bottom but at the top in relation to the motor vehicle vertical direction. The folding tray is thus designed as a cover. The batteries are then preferably positioned on a base panel, and the folding tray produced according to the invention is subsequently placed as a cover over the batteries on the base panel and is coupled to the base panel.

In all of the abovementioned embodiment variants, cooling structures may be interposed between the batteries and the base of the tray or cover. Here, it is for example possible for separate cooling plates to be arranged on the underside of the batteries. It is also possible for a cooling structure to be arranged on that side of the respective base of the tray or cover which is averted from the batteries. For example, cooling plates may be attached here.

To realize a particularly good exchange of heat between the underside of the batteries and base of the tray or cover, a thermally conductive medium may be interposed. This may be a foil or a thermally conductive paste.

Other advantages, features, properties and aspects of the present invention are set out in the following description. Preferred construction variants are illustrated in the schematic Figures. These afford a simple understanding of the invention. In the drawings.

Figure 1:
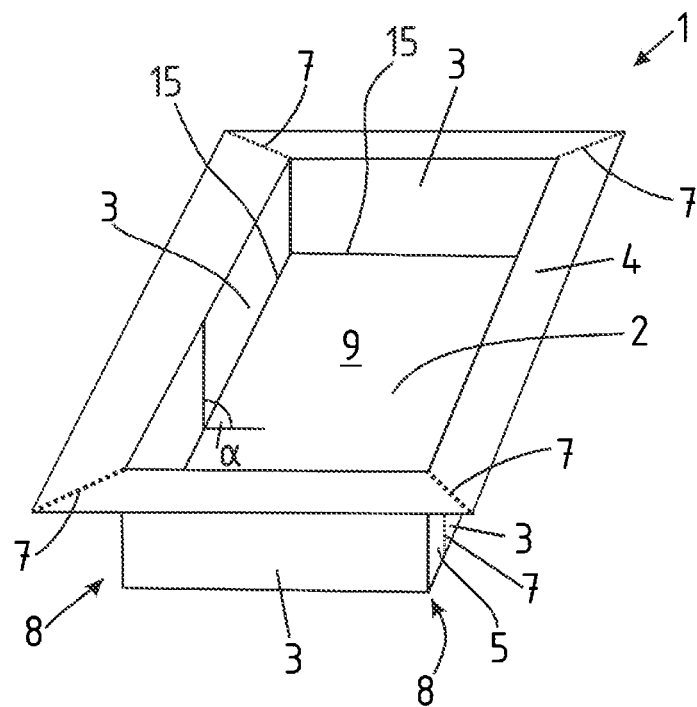
FIG. 1 is a perspective view of a tray according to the invention.
Figure 5:
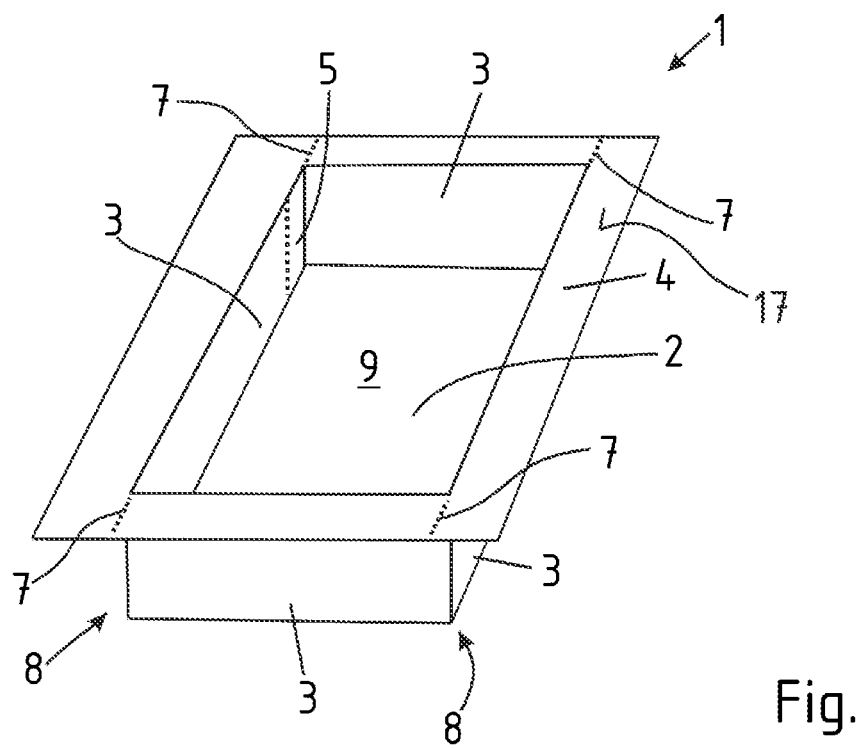
Figure 6:
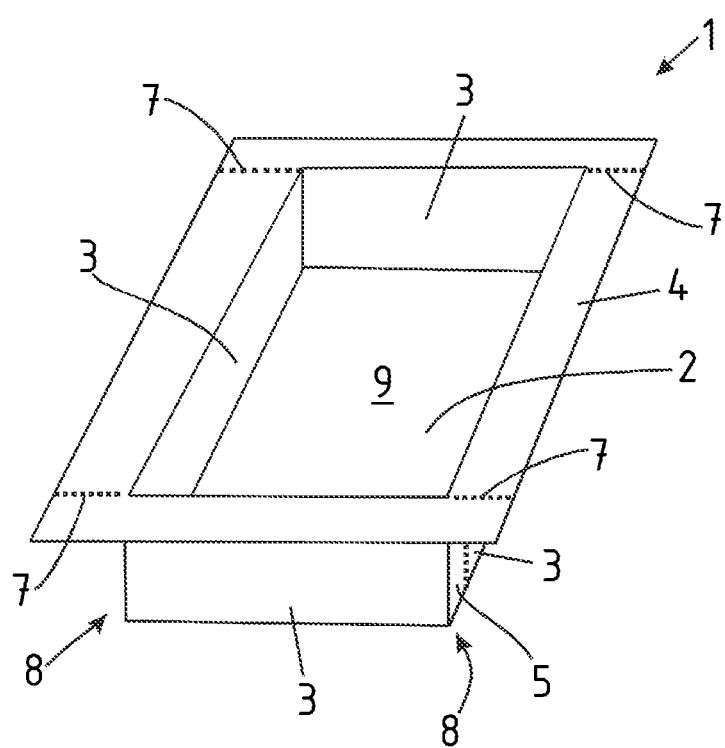
Figure 8:
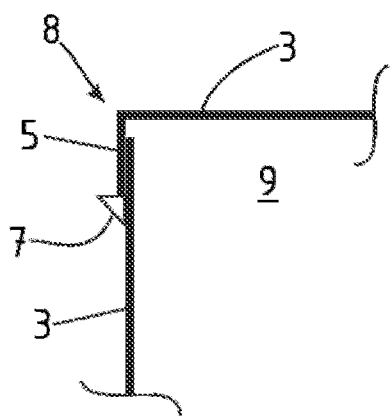
Figure 9:
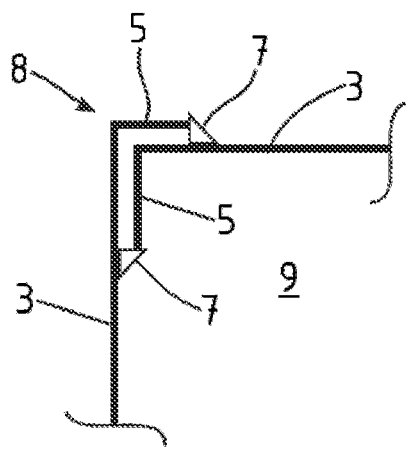
Figure 10:
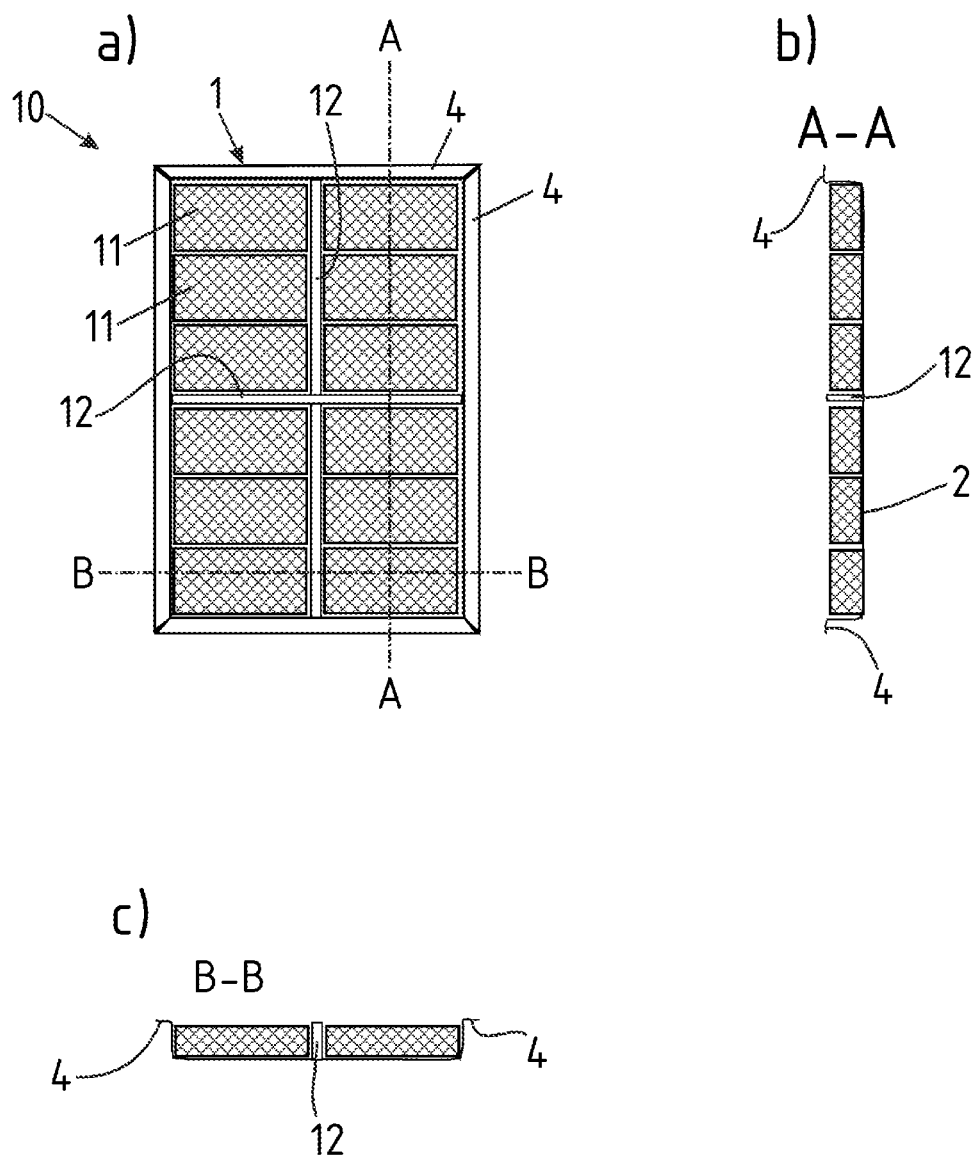
Figure 11:
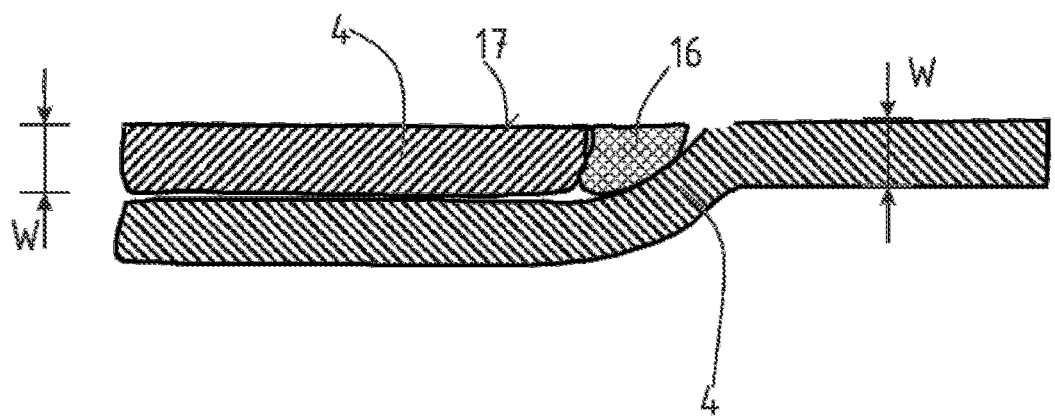
Figure 12:
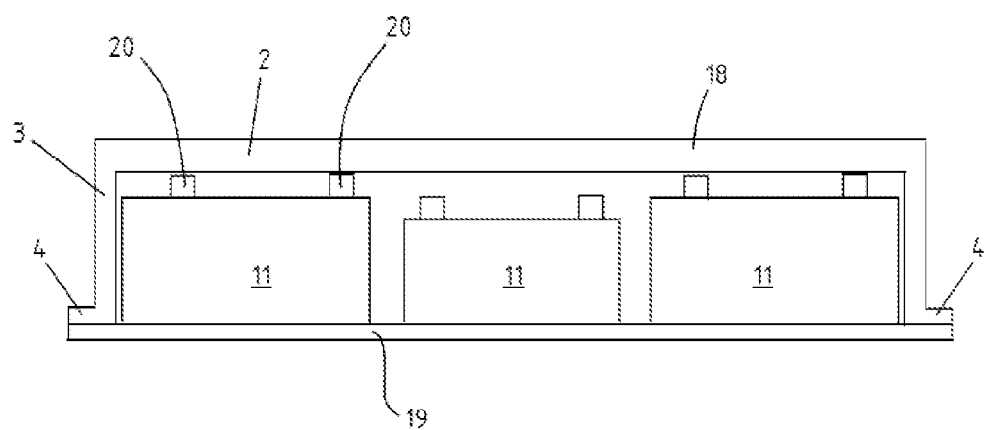

FIG. 5 shows an alternative construction variant of a tray with respect to FIG. 1, FIG. 6 shows an alternative construction variant of a tray with respect to FIG. 1, FIGS. 7, 8, 9 are various cross-sectional views through a corner region, FIGS. 10 a-c are various views of a battery carrier according to the invention, FIG. 11 is a sectioned view through a flange in the corner region and FIG. 12 shows an alternative design variant of the present invention with a cover as folding tray, and FIG. 13 shows an alternative design variant with a cover as folding tray.

In the Figures, the same reference numerals are used for components which are identical or similar, even if a repeated description is superfluous for reasons of simplicity.

FIG. 1 is a perspective view of a tray 1 of a battery carrier according to the invention. The tray 1 has to this end a base 2 and a peripheral wall produced from side walls 3 which are coupled to each other. A peripheral flange 4 protrudes from the side walls 3 again. According to the invention, there is arranged a joining plate 5 which is arranged in a corner region 8 of mutually adjoining or adjacent side walls 3 and which overlaps the right outer side wall with respect to the image plane and which is coupled to a joining seam 7. Furthermore, an angle $\alpha$ is indicated between the base 2 and side wall 3. According to the invention, this angle $\alpha$ may be 90° since the folding tray is not produced in the manner of a deep-drawn tray. The angle $\alpha$ may also be greater than 90° but preferably less than 95°, in particular less than 92°.

Figure 2:
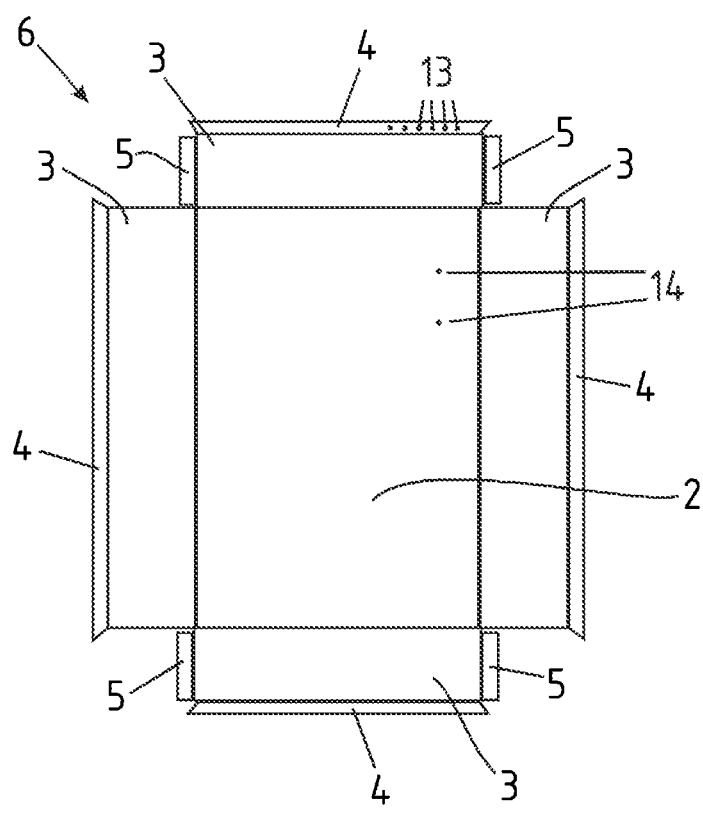
FIG. 2 shows a plate blank for producing a tray according to FIG. 1.

FIG. 2 shows a blank of a plate 6 from which the tray 1 illustrated in FIG. 1 is then produced by means of folding or bending operations. If the tray 1 is produced by means of shaping technology, joining seams 7 are further formed, wherein the joining plates 5 are coupled to the side wall 3 and the mutually adjacent portions of the peripheral flange 4 are coupled to each other in a materially engaging manner. The joining plates 5 are according to FIG. 1 arranged at the outer side and formed in each case on two opposing side walls 3. Holes 13 may be provided in the flange 4 in order, for example, to later mount a lid. Furthermore, holes 14 may be provided in the base 2, for example, in order to later fit screw connections here or for a drainage, for example, after the painting operation or a cataphoretic (KTL) coating from the tray.

Figure 3:
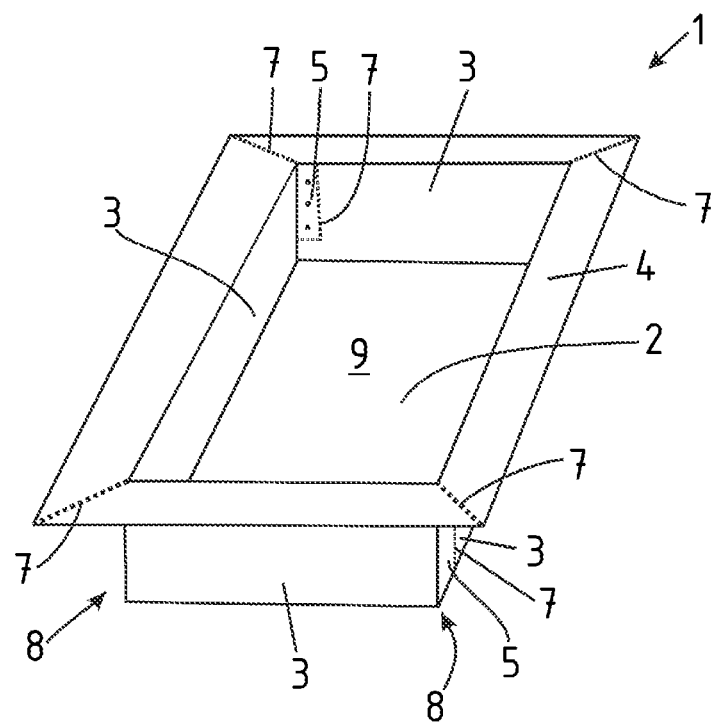
FIG. 3 shows an alternative construction variant of a tray according to FIG. 1.
Figure 4:
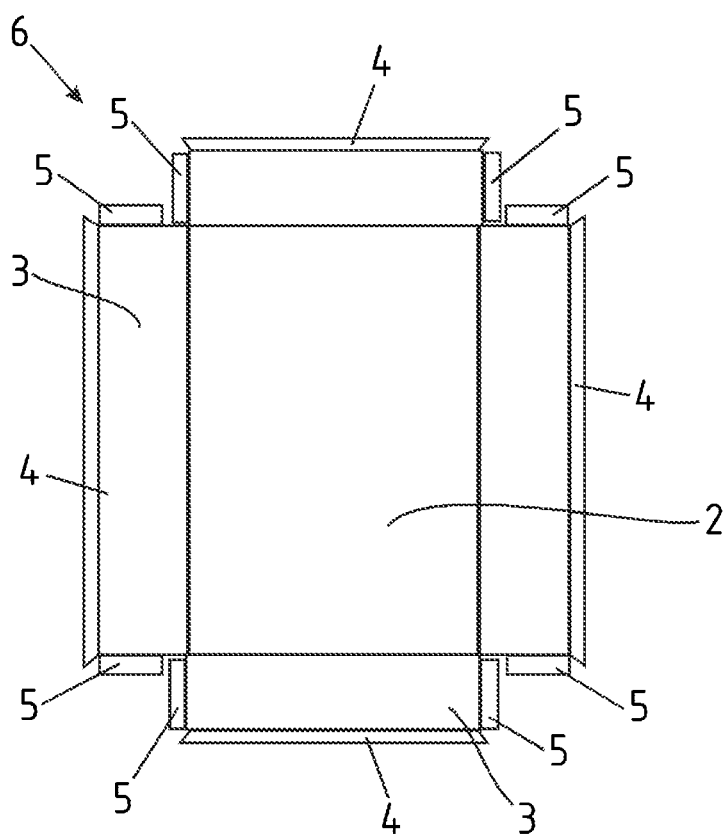
FIG. 4 shows a plate blank for producing a tray according to FIG. 3.

FIGS. 3 and 4 show a construction variant similar to FIGS. 1 and 2 with the difference that in this instance not only at a corner region 8 which has been produced in each case a joining plate 5 of a side wall 3 overlaps the adjacent side wall 3. Instead, there are formed in this instance in each corner region 8 two joining plates 5, wherein as illustrated in this instance the joining plates 5 of the respective end-side side wall 3, with respect to an inner space 9 of the wall, are arranged at the inner side and the joining plates 5 of the longitudinal-side side walls 3, with respect to the inner space 9, are arranged at the outer side. At the outer side, joining seams 7 are again constructed in order to couple the outerside joining plates 5 to the side walls 3. It is particularly preferable in this instance for the outer joining plate 5 to be seal-welded to the side wall 3. The inner joining plates 5 are spot-welded to the side wall 3. The flange is welded at a respective 45° angle in the corner regions.

FIGS. 5 and 6 show alternative construction variants, wherein in this instance according to FIG. 5 at the inner side the joining plate 5 is arranged on the respective side wall 3 and in this instance in particular a seal-welding is carried out.

According to FIG. 6, a joining plate 5 is arranged at the outer side. As a different feature, it can further be seen in FIGS. 5 and 6 that the peripheral flange 6 extending at the outer side is constructed by two adjacent side walls 3 in each case with a joining seam 7 as a projection of the extension of the end-side side wall 3 itself and not as illustrated in FIGS. 1 to 4 with a 45° angle. The resultant advantage is that the bending radius between the end-side side wall 3 and the flange is located in the separation plane of the flange 4 itself, whereas with the 45° variant according to FIGS. 1 to 4 the respective edges of the flange 4 which is produced can be better positioned with respect to each other.

Figure 7:
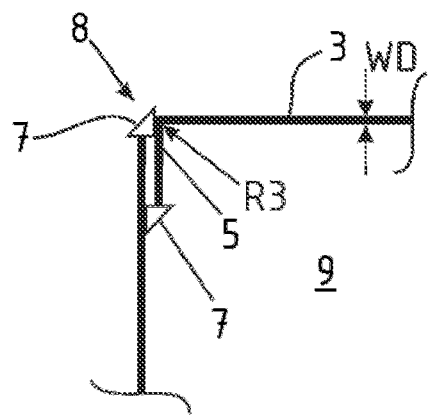

FIGS. 7, 8 and 9 show various arrangements of the joining plates 5 in accordance with a sectioned view through the corner region 8. According to FIG. 7, with respect to an inner space 9, the joining plate 5 of an end-side side wall 3 is arranged at the inner side with respect to the adjacent side wall 3. At each of two sides, a joining seam 7 is provided. At least one joining seam is constructed as a fluid-tight seam or both joining seams enclose a sealing mass. In particular, the outer joining seam 7 is constructed as a fluid-tight weld seam together with a 45° flange and the joining seam thereof is constructed in a continuous manner.

Furthermore, in FIG. 7 an inner radius R3 is illustrated between the joining plate 5 and side wall 3. This is preferably 10 times smaller than the wall thickness W of the side wall 3. The same applies to a radius on the bending edge 15 between the side wall 3 and base 2 (cf. FIG. 1).

According to FIG. 8, the joining plate 5 of a side wall 3 is illustrated so as to extend around the adjacent side wall 3 at the outer side, with respect to an inner space 9 of the tray 1, and coupled to a joining seam 7.

According to FIG. 9, two joining plates 5 are formed, therefore one joining plate 5 on each side wall 3. The respective joining plate 5 is constructed to be angled away so that a joining plate 5, with respect to an inner space 9, engages around the upper side wall 3 at the outer side with respect to the image plane and the joining plates 5 of the upper side wall 3 adjoins the side wall 3 at the left image plane at the inner side. In each case, the two joining plates are coupled to a joining seam 7 with the respective side wall 3.

FIG. 10a is a plan view of a battery carrier 10 according to the invention with respective sectioned views according to FIGS. 10b and 10c. The battery carrier 10 has the tray 1 according to the invention, wherein batteries 11 are arranged in the tray 1. Reinforcement struts 12 are further arranged in the tray 1 so as to extend transversely and longitudinally. The batteries 11 may, for example, be secured to the reinforcement struts 12 and where applicable to the tray 1 itself. The flange 4 is illustrated so as to extend at the outer side. The tray 1 may optionally (not illustrated in greater detail) be closed with a cover, for example, screwed to the flange with a seal being interposed.

FIG. 11 is a cross-sectional view through a flange 4. The right flange 4 with respect to the image plane is embossed or offset by a wall thickness W so that it engages below the left flange 4. A support face 17 which is produced (cf. FIG. 5) for supporting a cover is consequently planar. Sealing mass 16 may be arranged in a gap.

FIG. 12 shows the alternative design variant of the present invention, in which the folding tray is designed as a cover 18. The batteries 11 are firstly positioned on a base panel 19. The base panel 19 itself may be a reinforced base panel 19, such that it bears in particular the weight of the batteries 11 of up to several hundred kg.

The batteries 11 are then covered by the folding tray as cover 18. The cover 18 likewise has an externally encircling flange 4 by means of which it is coupled to the base panel 19. The cover 18 is produced as described above for the tray, in particular in FIGS. 1 to 11. The cover 18 likewise has an encircling wall and a base 2. The encircling wall is formed by the side walls 3.

FIG. 13 shows an alternative design in relation to the folding tray, designed as a cover 18, of FIG. 12. In the exemplary embodiment in FIG. 13, the electrical terminals 20 of the batteries 11 are, in the installed situation, arranged so as to point downward in the motor vehicle vertical direction. The electrical terminals 20 are thus directed toward the base panel 19. The batteries 11 can thus be installed in suspended fashion in the cover 18. Said batteries may, in the cover 18, be fixed to the base 2 or to the encircling side walls 3.

LIST OF REFERENCE NUMERALS

1—Tray
2—Base
3—Side wall
4—Flange
5—Joining plate
6—Plate
7—Joining seam
8—Corner region
9—Inner space
10—Battery carrier
11—Battery
12—Reinforcement strut
13—Holes
14—Hole
15—Bending edge
16—Sealing mass
17—Support face
18—Cover
19—Base panel
20—Terminals
α—Angle
R3—Inner radius
W—Wall thickness

The invention claimed is:

1. A battery carrier for an electric motor vehicle, the battery carrier comprising a tray having:
   a base;
   a peripheral wall which protrudes from the base and which includes a plurality of side walls coupled to each other;
   a flange which protrudes from the peripheral wall in an outward direction; and
   in at least one corner region of the peripheral wall, at least one joining plate which is formed on a side wall among the plurality of side walls and overlaps an adjacent side wall among the plurality of side walls,
      wherein the flange extends along an entire perimeter of the tray,
      wherein the tray is integrally produced as a folding component and in a materially integral manner from a plate, and
      wherein the joining plate and the adjacent side wall are joined to each other by welding in combination with a sealing agent or sealing material between the joining plate and the adjacent side wall.

2. A battery carrier according to claim 1, wherein the joining plate and the adjacent side wall are joined to each other by a thermal joining seam, weld seam, and/or adhesive.

3. A battery carrier according to claim 2, wherein the thermal joining seam is a continuous weld seam.

4. A battery carrier according to claim 1, wherein the joining plate, with respect to an inner space of the tray, overlaps the adjacent side wall at an outer side.

5. A battery carrier according to claim 1, wherein the flange in a respective corner region of two adjacent side walls is coupled as a projected extension of a side wall, by a thermal joining seam, parallel to the base, or extends outward at a 45° angle by a thermal joining seam.

6. A battery carrier according to claim 1, wherein the plate the tray is produced from is a metal plate.

7. A battery carrier according to claim 1, further comprising, in the tray, reinforcement struts configured to receive batteries arranged in the tray.

8. A battery carrier according to claim 1, wherein the plate the tray is produced from is made of steel having a tensile strength Rm greater than 600 MPa.

9. A battery carrier according to claim 1, wherein the base and/or the side walls have embossings for reinforcement.

10. A battery carrier according to claim 1, wherein the plate the tray is produced from is a steel plate.

11. A battery carrier according to claim 1, wherein the plate the tray is produced from is made of an aluminum alloy in a rolled state with a tensile strength Rm greater than 250 MPa.

12. A battery carrier according to claim 1, wherein the joining plate, with respect to an inner space of the tray, overlaps the adjacent side wall at an inner side.

* * * * *